United States Patent
Bihannic et al.

(10) Patent No.: US 11,240,744 B2
(45) Date of Patent: Feb. 1, 2022

(54) METHOD FOR CHARGING DATA OF AN APPLICATION ROUTED ON A SLICE OF A COMMUNICATION NETWORK

(71) Applicant: ORANGE, Issy-les-Moulineaux (FR)

(72) Inventors: Nicolas Bihannic, Chatillon (FR);
Jean-Michel Cornily, Chatillon (FR);
Isabelle Finkler, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/642,242

(22) PCT Filed: Aug. 24, 2018

(86) PCT No.: PCT/FR2018/052100
§ 371 (c)(1),
(2) Date: Feb. 26, 2020

(87) PCT Pub. No.: WO2019/043324
PCT Pub. Date: Mar. 7, 2019

(65) Prior Publication Data
US 2020/0389844 A1 Dec. 10, 2020

(30) Foreign Application Priority Data
Aug. 28, 2017 (FR) ...................... 1757926

(51) Int. Cl.
*H04W 48/18* (2009.01)
*H04W 76/11* (2018.01)
*H04W 8/08* (2009.01)
*H04W 24/02* (2009.01)
*H04W 16/04* (2009.01)
*H04L 12/24* (2006.01)
*H04L 12/26* (2006.01)

(52) U.S. Cl.
CPC ......... *H04W 48/18* (2013.01); *H04L 41/0806* (2013.01); *H04L 41/0893* (2013.01);
(Continued)

(58) Field of Classification Search
CPC ....... H04W 48/18; H04W 76/11; H04W 8/08; H04W 24/02; H04W 16/04;
(Continued)

(56) References Cited

U.S. PATENT DOCUMENTS

2011/0196795 A1* 8/2011 Pointer ................. G06Q 40/12
705/51
2019/0208573 A1* 7/2019 Yang ..................... H04W 76/11
(Continued)

FOREIGN PATENT DOCUMENTS

WO    2017143047 A1    8/2017
WO   WO 2017/143047 A1 * 8/2017 ............ H04W 16/04

OTHER PUBLICATIONS

International Search Report dated Dec. 11, 2018 for corresponding International Application No. PCT/FR2018/052100, filed Aug. 24, 2018.
(Continued)

*Primary Examiner* — Inder P Mehra
(74) *Attorney, Agent, or Firm* — David D. Brush; Westman, Champlin & Koehler, P.A.

(57) ABSTRACT

A method for fee-charging data of an application transmitted on a section of a communication network, implemented in a device for accessing the network. The method includes: detecting an activation of the application; transmitting an identification message including information relating to the identification of the application intended for an entity for managing sections of the network; receiving, from the entity for managing sections of the network, a notification message including at least one identifier of a section of the network and of fee-charging parameters associated with the at least one identifier; and, depending on the received message, initializing the fee-charging of the data of the application.

15 Claims, 5 Drawing Sheets

Figure 1:
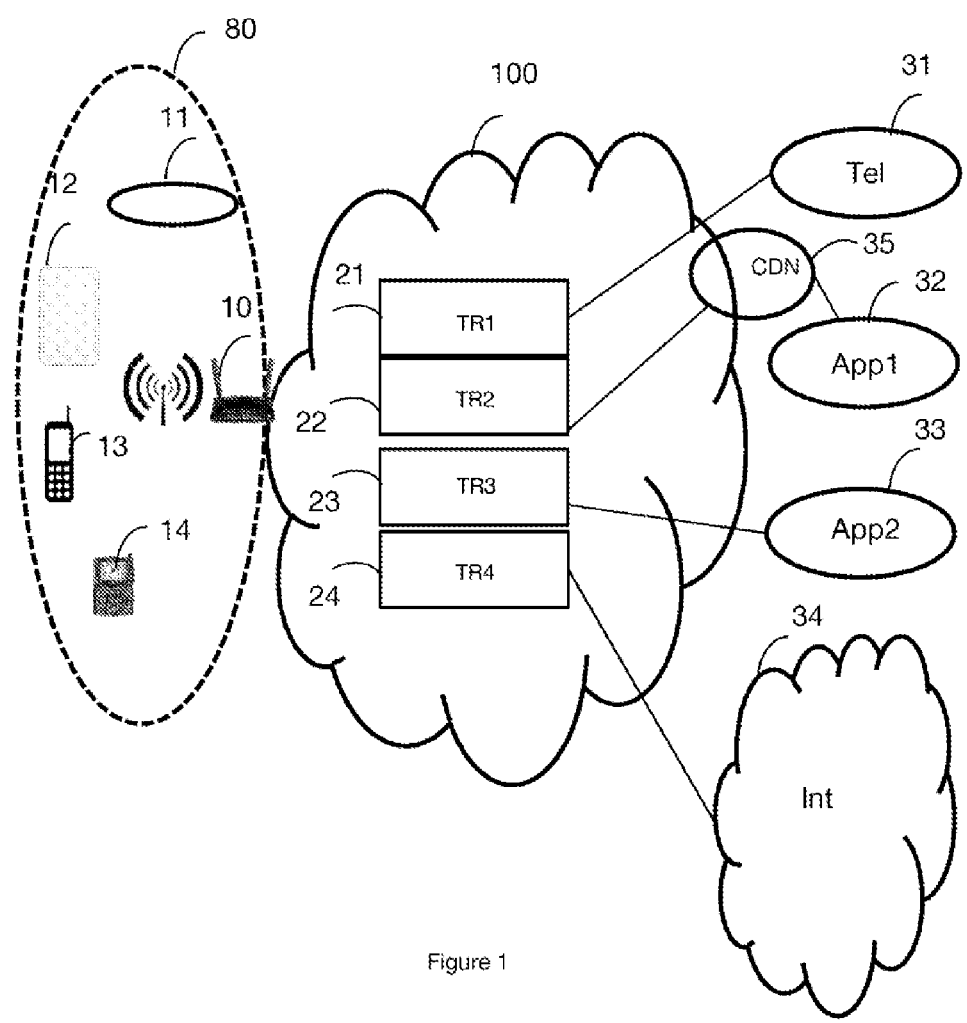

(52) U.S. Cl.
CPC .............. *H04W 8/08* (2013.01); *H04W 24/02* (2013.01); *H04W 76/11* (2018.02)

(58) Field of Classification Search
CPC . H04L 41/0806; H04L 41/0893; H04L 43/08; H04L 41/5029; H04L 41/5041
USPC .......................................................... 370/329
See application file for complete search history.

(56) References Cited

U.S. PATENT DOCUMENTS

| | | | | |
|---|---|---|---|---|
| 2019/0364541 | A1* | 11/2019 | Ryu | H04W 76/25 |
| 2020/0169951 | A1* | 5/2020 | Cai | H04W 48/18 |
| 2021/0092634 | A1* | 3/2021 | Kang | H04W 28/0247 |

OTHER PUBLICATIONS

Written Opinion of the International Searching Authority dated Dec. 11, 2018 for corresponding International Application No. PCT/FR2018/052100, filed Aug. 24, 2018.
3GPP specifications TF 23.799 v14.0.0 (Dec. 2016) and 3GPP TS 23.501 v1.1.0 (Jul. 2017).
English translation of the Written Opinion of the International Searching Authority dated Jan. 4, 2019, for corresponding International Application No. PCT/FR2018/052100, filed Aug. 24, 2018.
"3rd Generation Partnership Project; Technical Specification Group Services and System Aspects; System Architecture for the 5G System; Stage 2 (Release 15)", 3GPP TS 23.501 V1.2.0 (Jul. 2017), 166 pages.
"NGTP in a nutshell", by NGTP Group, http://www.ngtp.org, dated Sep. 20, 2010, 18 pages.

* cited by examiner

METHOD FOR CHARGING DATA OF AN APPLICATION ROUTED ON A SLICE OF A COMMUNICATION NETWORK

CROSS-REFERENCE TO RELATED APPLICATIONS

This Application is a Section 371 National Stage Application of International Application No. PCT/FR2018/052100, filed Aug. 24, 2018, which is incorporated by reference in its entirety and published as WO 2019/043324 A1 on Mar. 7, 2019, not in English.

1. FIELD OF THE INVENTION

The patent application lies in the field of mobile telecommunications infrastructures and of techniques relating to charging for services implemented on the basis of network slice architectures.

2. PRIOR ART

The new-generation mobile networks, or fifth-generation networks, will support a more significant number of services and applications than the networks of previous generations (2G, 3G, 4G). Among the new services proposed on 5G networks, IoT (in English Internet Of Things) services as well as mobility services based on vehicular networks, that is to say networks implemented in transport means (train, airplane, car . . . ), are the most emblematic. These new services are accompanied by new value chains in which new players, which include car manufacturers, insurers, automobile equipment makers, are involved and seek to obtain a remuneration for their participation in the provision of services to clients.

The specifications of 5G networks will furthermore be accompanied by fairly significant modifications of the architectures of mobile networks. Thus, until the "4G" generation of mobile network currently undergoing deployment in a majority of countries, the various network architectures usually rely on very specific equipment dedicated to certain precise functionalities, be it at the access network or core network level, in particular as regards the transmission of packets from or to a mobile terminal.

The transmission channels established between a mobile terminal and a mobile network are usually not very numerous and are used to convey in a differentiated manner the packets of the real-time services (voice, video . . . ) on the one hand and the packets of "Internet" data on the other hand. This implementation offers in particular a limited flexibility as regards the possibilities of differentiating the streams which today are conveyed on the "Internet" channel. This lack of flexibility and of upgradability inherent in this type of conventional architecture has led to envisage the adoption of more flexible architectures for the next generation of mobile networks so as to be able to respond rapidly to extremely diverse demands in terms of traffic or quality of service. It should be noted that the 5G networks are intended to be relevant to mobile networks and also to fixed networks. Among the solutions envisaged, one of the most promising solutions relies on a network slicing technique, specified in particular in the 3GPP technical report TR 23.799 v2.0.0 of December 2016. Network slices make it possible as it were to specialize the network as a function of application-related needs, latency constraints, types of clients, types of terminals, security constraints, etc.

Provision is made for a multitude of network slices to be able to be established simultaneously within one and the same telecommunications network, said slices making it possible to offer specific characteristics in respect of the various services to various customers on one and the same network. The implementation of network slices is favored by the ongoing development of virtualized architectures offering more flexibility and dynamic character in terms of deployment. The elementary functions for conveying and processing data making it possible to implement a network slice require characteristics (modularity, adaptation of capacity, scalability) that are more easily deployed by virtual instances.

However, this flexibility offered by architectures based on network slices is confronted with constraints in terms of metering of streams and charging. Indeed, the deployment of new services in particular based on vehicular networks, on the basis of network slice architectures, is not accompanied in the techniques pertaining to the prior art by possibilities of easy ability to associate traffic with a particular provider or of an ability to distinguish the various streams so as to meter them and bill them appropriately. The charging solutions implemented in the techniques pertaining to the prior art usually require an ability to identify traffic, either in the access network or the core network, or in a service platform. These solutions are expensive since they make it necessary to analyze all the traffic, in particular the traffic transmitted on the "Internet" channel. They are inoperative if the provider's traffic is encrypted and they offer limited flexibility, in particular in terms of differentiation of the streams for a given partner in particular. Furthermore, the client is not informed of the charging conditions of a given service at a given moment, these conditions being able to change over time, and he can still less accept or refuse the proposed conditions. In the document http://ngtp.org/wp-content/uploads/2013/12/NGTP20_nutshell.pdf (version 1.0, November 2010), the NGTP (in English Next Generation Telematics Protocol) consortium proposes for example a service platform making it possible to steer the traffic of a mobile terminal to the various providers but does not involve the client in any way, other than to inform him.

The problems relating to the differentiated charging for streams in an architecture of mobile networks are also encountered in respect of services based on sponsored data allowing an operator to bill the sponsored services to a third-party partner, rather than to the client as is generally the case. These services also require solutions of DPI (in English "Deep Packet Inspection") type so as to be able to identify these streams in order not to charge the client a fee, but such solutions are complex in terms of configuration to identify the streams of sponsored services.

More globally, this issue of differentiated charging impacts the so-called vertical markets encompassing the so-called intelligent town, intelligent agriculture or future industry services involving different players and identified as catalyst for the new network architectures.

The object of the present invention is to remedy these drawbacks.

3. DISCLOSURE OF THE INVENTION

The invention seeks to improve the situation with the aid of a method for charging for the data of an application that are transmitted on a slice of a communication network, implemented in a device for access to the network and comprising:

a step of detecting an activation of the application, a step of sending an identification message comprising an information item relating to the identification of the application destined for a network slices management entity, a step of receiving from the network slices management entity a notification message comprising at least one network slice identifier and charging parameters associated with the at least one identifier, as a function of the message received, a step of initializing the charging for the data of the application.

As a function of criteria relating to quality of service, to security, to the terminal and/or to the application, the streams sent and received by a terminal for an application are transported on an appropriate network slice. When a new application is activated, that is to say when it is enabled or started, a network slice must be determined by the access device to which the terminal is attached, in collaboration or otherwise with an equipment of the network, to convey the data relating to the application. In the techniques pertaining to the prior art, the determination of the network slice is carried out as a function for example of the identifier of the application and the association between the application and a network slice is carried out by one or more items of equipment of the network alone. Knowing that a growing number of applications is envisaged, that the applications can be installed on the access device but also in other terminals attached to the access device, the access device must comprise means for detecting that a new application is activated by itself or by a terminal communicating with its opposite parties by way of the access device. The access device must know the network slice to be used for the streams relating to the application. It therefore invokes an entity within the communication network, to obtain a slice identifier and the charging parameters related to the slice, these parameters specifying the tariff conditions associated with the transport of the application on the network slice corresponding to the identifier. It may be possible that, for an application, several network slices can be proposed by the management entity with different tariff conditions for each.

On the basis of this information, the access device can on the one hand identify the network slice relating to the application which has just been activated and also obtain the tariff conditions relating to the network slice, thus allowing it, when several network slices are proposed, to select a network slice by knowing a priori the type of charging, the advantages in terms of charging or else the characteristics of cost splitting between the players involved in providing the data. This information is in particular significant when the access device is used to connect terminals whose manager is different from the manager of the access device or else when it is desirable to be able to identify data in a simple manner, for example by associating an application with a network slice having specific charging parameters, and to charge a fee for these data in accordance with the charging parameters received. The charging parameters may or may not be specific to a network slice and a network slice may comprise several charging parameters. The access device is involved in choosing the network slice, based in particular on the parameters received, and can thus initialize the charging for the application-related streams in accordance with the parameters received, for example by transmitting a message to the network slices management equipment. Thus, the access device contributes to the choosing of the network slice and gives its authorization for the charging for the streams in accordance with the charging parameters of the chosen network slice.

According to one aspect of the invention, the method of charging furthermore comprises:

a step of sending to the network slices management entity an initial-configuration message comprising at least one parameter relating to the access device, upon the attachment of the access device to the network, a step of receiving from the management entity an initial-notification message comprising at least one network slice identifier and charging parameters associated with the identifiers.

When the access device connects to the network for the first time, it may be useful for certain network slice identifiers, as well as the associated charging parameters, to be transmitted to it by default. For example, the network slice identifiers most customarily used, corresponding to the Internet slices and to the default real-time services, will be able to thus be transmitted to the access device. Furthermore, by dispatching parameters such as its identity, the attachment network, the type of connection or its capacities, it is possible for the management entity to transmit network slice identifiers suited to the context of the access device. Thus, operator A's "management" network slice identifiers, allowing operator A to manage the device remotely, and a network slice identifier making it possible to transport the streams of a security service, such as for example the European emergency calls service for vehicles (in English e-call), can be communicated to an access device attached to a network of operator A, corresponding to a router implemented in a car. The charging parameters are transmitted with the network slice identifiers in such a way that the access device can, if relevant, activate or otherwise the network slice or else choose to limit or on the contrary to increase the data traveling on this slice. The client of an automobile manufacturer's access device may for example be little inclined to activate a network slice specific to the manufacturer's applications and characterized by high costs of use borne by the client.

According to another aspect of the invention, the charging method furthermore comprises a step of selection by the access device of a network slice identifier and of the associated charging parameters.

If the access device obtains several network slice identifiers for an information item relating to a transmitted application, it can choose the network slice corresponding to the identifier having charging parameters corresponding to its criteria. Thus, if it obtains an identifier of a first network slice whose billing is indicated as zero and a network slice with parameters indicating billing as a function of the volume of the data, it will probably choose the identifier of the former. This selection step is optional since the access device may for example not select any identifier and connect to the various network slices, it being possible for the choice to transmit data streams on one network slice or another to depend on other parameters, typically on quality of service. In the case where the management entity does not wish to leave the choice of the network slice to be selected entirely to the access device, it will transmit to the access device a single network slice identifier or the whole set of identifiers of the slices to which the access device must connect.

According to another aspect of the invention, the charging method furthermore comprises a step of sending by the access device of a message of acceptance comprising the selected network slice identifier.

With the aim of informing the management entity of the choice by the access device of the selected network slices, the device transmits an acceptance message comprising the selected network slice identifier. The acceptance message can furthermore comprise the charging parameters associated with the network slice, in particular in the case where a network slice could have charging parameters to be chosen by the access device from among the set of parameters received. This message can advantageously be used by the management device to inform other entities, for example the charging servers and the entities responsible for gathering and metering the data sent on the network slice. This message can thus be used as a trigger of the metering of the data by the entities responsible for metering, charging and billing.

According to another aspect of the invention, the charging method furthermore comprises a step of sending, to the network slices management entity, of a refusal message.

In particular in the case where the network slice identifier and the associated charging parameters are not appropriate for the access device, the latter can refuse them by sending a message to the management device indicating to the latter that the network slice identifiers received and the tariff conditions are not appropriate for it. The access device can thus send a refusal message if it decides not to select a network slice for a given application or for a given terminal. On receipt of this refusal message, the management device can on the one hand inform the entities responsible for charging that the data relating to the application are not billed according to the proposed parameters and on the other hand optionally propose other identifiers with other charging parameters.

According to another aspect of the invention, the charging method furthermore comprises a step of receiving a recommendation message comprising the identifier of another, so-called default, network slice.

In the case where the access device has sent a refusal message in respect of the network slice identifiers and the charging parameters proposed by the management entity, the latter can propose to the access device a so-called default network slice identifier having charging parameters that are probably more acceptable for the access device. This slice may for example be the network slice used for the Internet applications not requiring any constraints and whose charging is carried out for example as a function of the volume of data transmitted on the network slice and in accordance with the type of contract of the access device. In the case where no particular agreement exists between the terminal activating the application and the access device, the use of a "default Internet" network slice not guaranteeing any quality of service or indeed availability other than "best effort" can be favored.

According to another aspect of the invention, the charging method furthermore comprises a step of receiving a message of modification of charging parameters associated with a network slice.

The charging parameters may make it necessary to be updated for a given network slice identifier or for several network slice identifiers. Thus a change of tariff policy may make it necessary to inform the access devices of these new conditions via the employment of new charging parameters. Likewise if the charging for a given network slice is as a function of a certain volume of data, it may be necessary to inform the access device of the tariff conditions corresponding to the exceeding of the data volume for a network slice. This information can be exploited by the access device for example to inform the manager of the terminal that activated the application of a security problem detected on the basis of the significant volume of data noted or to inform the manager of the terminal of new provisions in the contract binding the manager of the access device and the operator managing the terminal.

According to another aspect of the invention, in the charging method, the detection step is carried out by the receiving of data relating to the application originating from a terminal attached to the access device.

Detection of the activation of an application can be carried out according to various schemes. If the application is implemented on the access device, the access device is informed directly of the execution of an application by the operating system in particular. In the case where an application is executed on a terminal connected to the access device, for example by using a Wi-Fi or Bluetooth connection, the access device can detect the launch of an application necessitating the requesting of a network slice and charging parameters, by analyzing the traffic received on the Bluetooth or Wi-Fi link. The data received by the access device can correspond to data arising from the activated application or else to so-called control data transmitted by the terminal to the access device indicating that a new application is activated; the control data indicating the type of application so as to obtain a network slice and charging parameters suited to the application.

According to another aspect of the invention, the charging method furthermore comprises
- a step of sending, to a terminal attached to the access device, of an information message comprising a data item relating to the at least one network slice identifier and the charging parameters associated with the at least one identifier,
- a step of receiving, from the terminal of a recommendation message comprising an information item relating to the initialization of the charging.

The access device, when it receives the slice identifiers and the associated charging parameters, transmits to the terminal that activated the application for which a network slice has to be determined, an information message to obtain a recommendation about the slice identifier to be selected. The terminal may for example request the user's opinion in respect of a billing associated with a slice and on the basis of this opinion, inform the access device about the agreement or disagreement thereof for the type of charging proposed. Thus, the access device can assure itself of the agreement of the terminal, and therefore of the user, before choosing an identifier and the associated charging parameters, and initializing the charging for the data for the application activated on the terminal. These messages exchanged between the charging device and the terminal are in particular significant when the charging device obtains new charging parameters for a given network slice identifier.

According to another aspect of the invention, in the charging method, the management entity is an NSSF device.

The object of the NSSF (in English Network Slice Selection Function) device is to allocate a network slice corresponding to the needs of a terminal. This function, specified in the 3GPP (in English 3rd Generation Partnership Program) document TS 23.501 v1.2.0 (July 2017), can advantageously transmit to the terminal charging parameters corresponding to the network slices. The NSSF device can obtain these charging parameters of the charging system so as in particular to take into account the agreements between the operator transmitting the information to the terminal and the managers of the terminals and of the gateway.

According to another aspect of the invention, in the charging method, the charging parameters are included in S-NSSAI data.

The S-NSSAI (in English Single Network Slice Selection Assistance Information) data are transmitted by an NSSF device so as to transport diverse items of information relating to a network slice to be allocated to a terminal. The S-NSSAI data, specified in the 3GPP document TS 23.501 v1.2.0 (July 2017), comprise two fields entitled SST (in English Slice/Service type) and SD (in English Slice Differentiator). The SST field includes information relating to the services supported in terms of characteristics and behavior while the SD field comprises complementary information. The charging parameters can advantageously be transmitted in the SD field of the S-NSSAI data transmitted to the terminal.

The various aspects of the charging method which have just been described can be implemented independently of one another or in combination with one another.

The invention also relates to a device for charging for the data of an application that are transmitted on a slice of a communication network, implemented in a device for access to the network and comprising:
- a detector, able to detect an activation of the application,
- a sender, able to send an identification message comprising an information item relating to the identification of the application, destined for a network slices management entity,
- a receiver, able to receive from the network slices management entity a notification message comprising at least one network slice identifier and charging parameters associated with the at least one identifier,
- an initialization module, able to initialize a charging for the data of the application.

This device, able to implement in all its embodiments the charging method which has just been described, is intended to be implemented in an access device can be an equipment for residential customers (box, cpe (in English Customer Premises Equipment) or professional customers, which is connected to a fixed network or to a mobile network. The access device can also be a terminal, a modem, a femtocell device, etc.

The invention also relates to a charging system comprising
- an access device comprising a charging device,
- a network slices management entity comprising
  - a receiver, able to receive an identification message comprising an information item relating to the identification of the application,
  - a sender, able to send a notification message comprising at least one network slice identifier and charging parameters associated with the at least one identifier,
  - a selection module, able to select at least one network slice identifier and charging parameters associated with the at least one identifier.

The invention also relates to a computer program comprising instructions for the implementation of the steps of the charging method which has just been described, when this program is executed by a processor.

This program can use any programming language, and be in the form of source code, object code, or of code intermediate between source code and object code, such as in a partially compiled form, or in any other desirable form.

The invention also envisages an information medium readable by a computer, and comprising instructions of the computer program such as is mentioned hereinabove.

The information medium can be any entity or device capable of storing the programs. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can be in particular downloaded over a network of Internet type.

Alternatively, the information medium can be an integrated circuit in which the program is incorporated, the circuit being adapted to execute or to be used in the execution of the method in question.

4. PRESENTATION OF THE FIGURES

Figure 2:
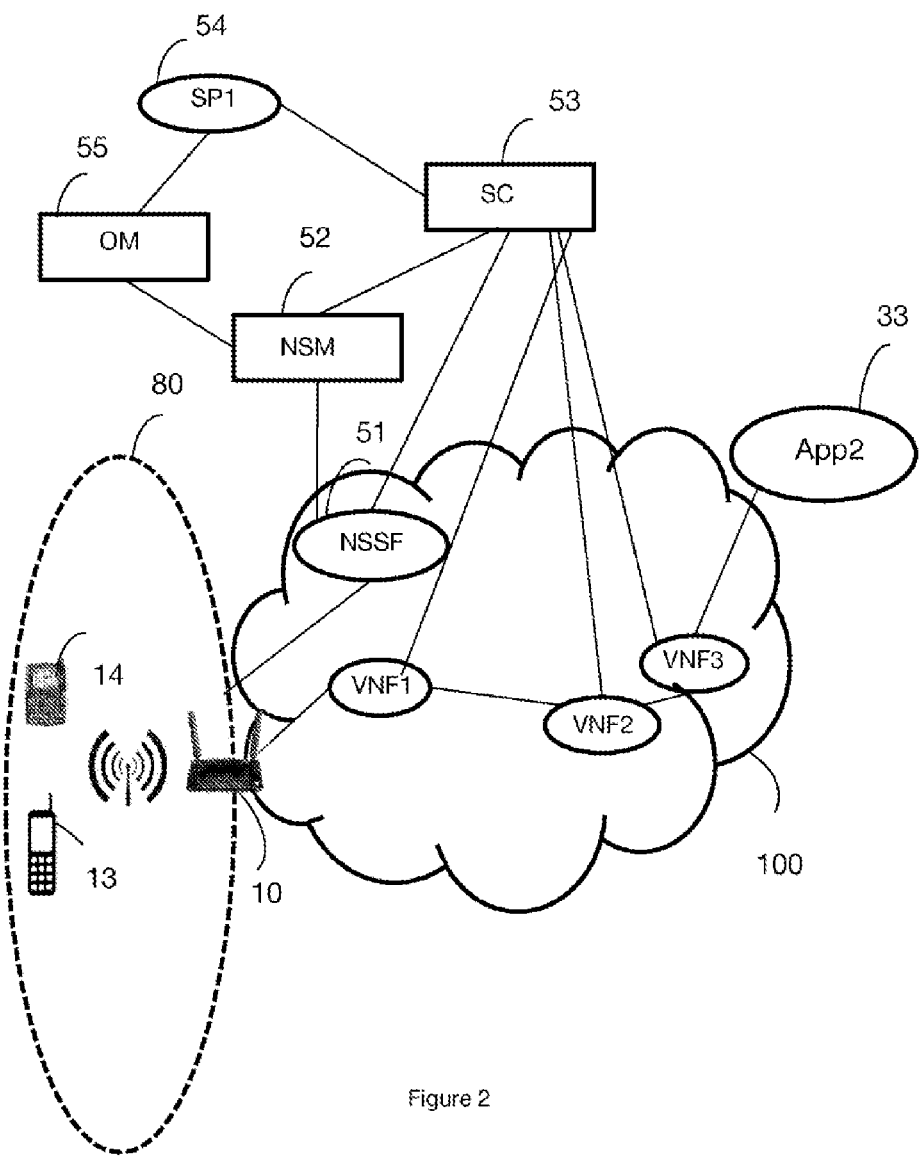
Figure 3:
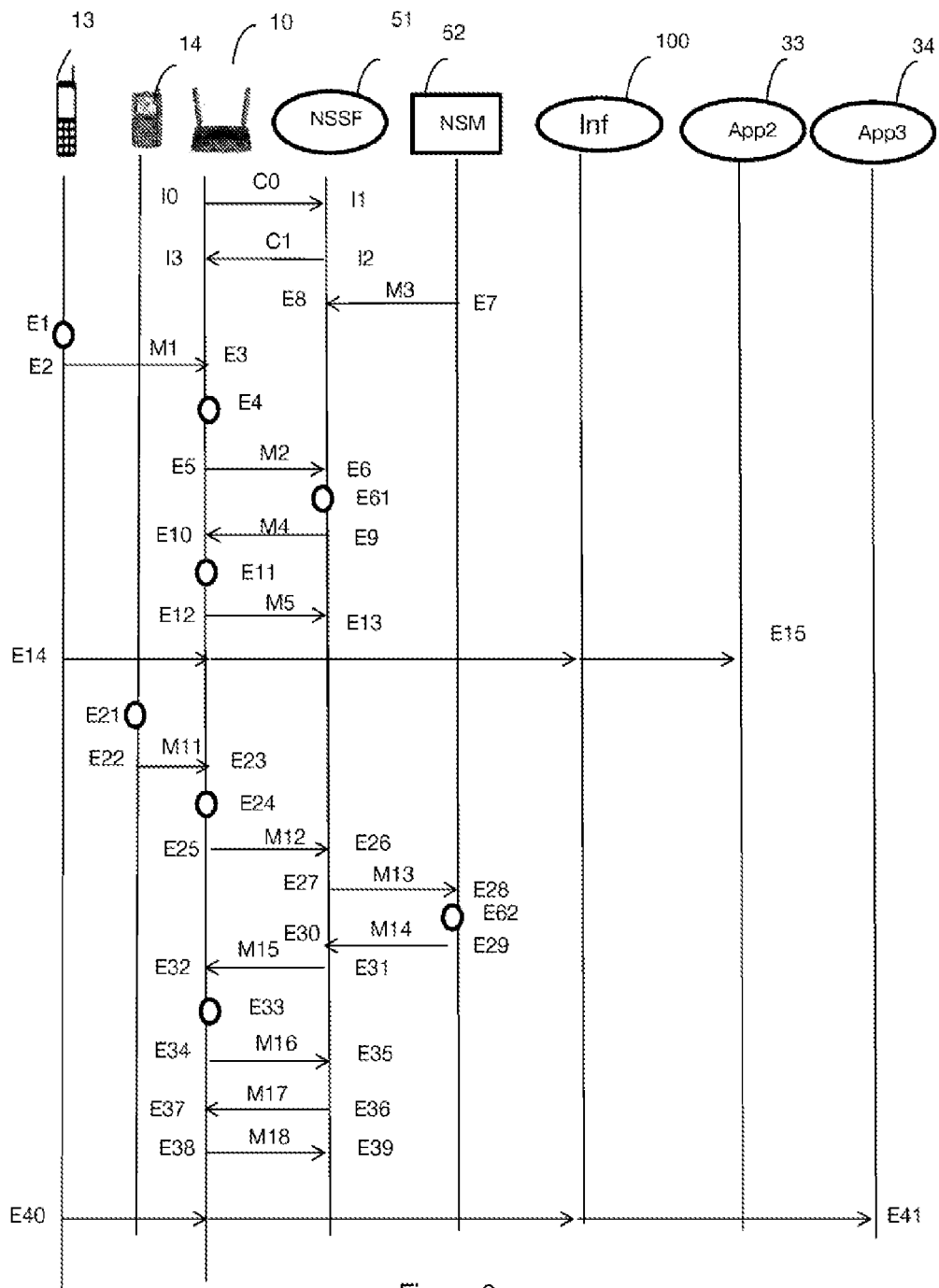
Figure 4:
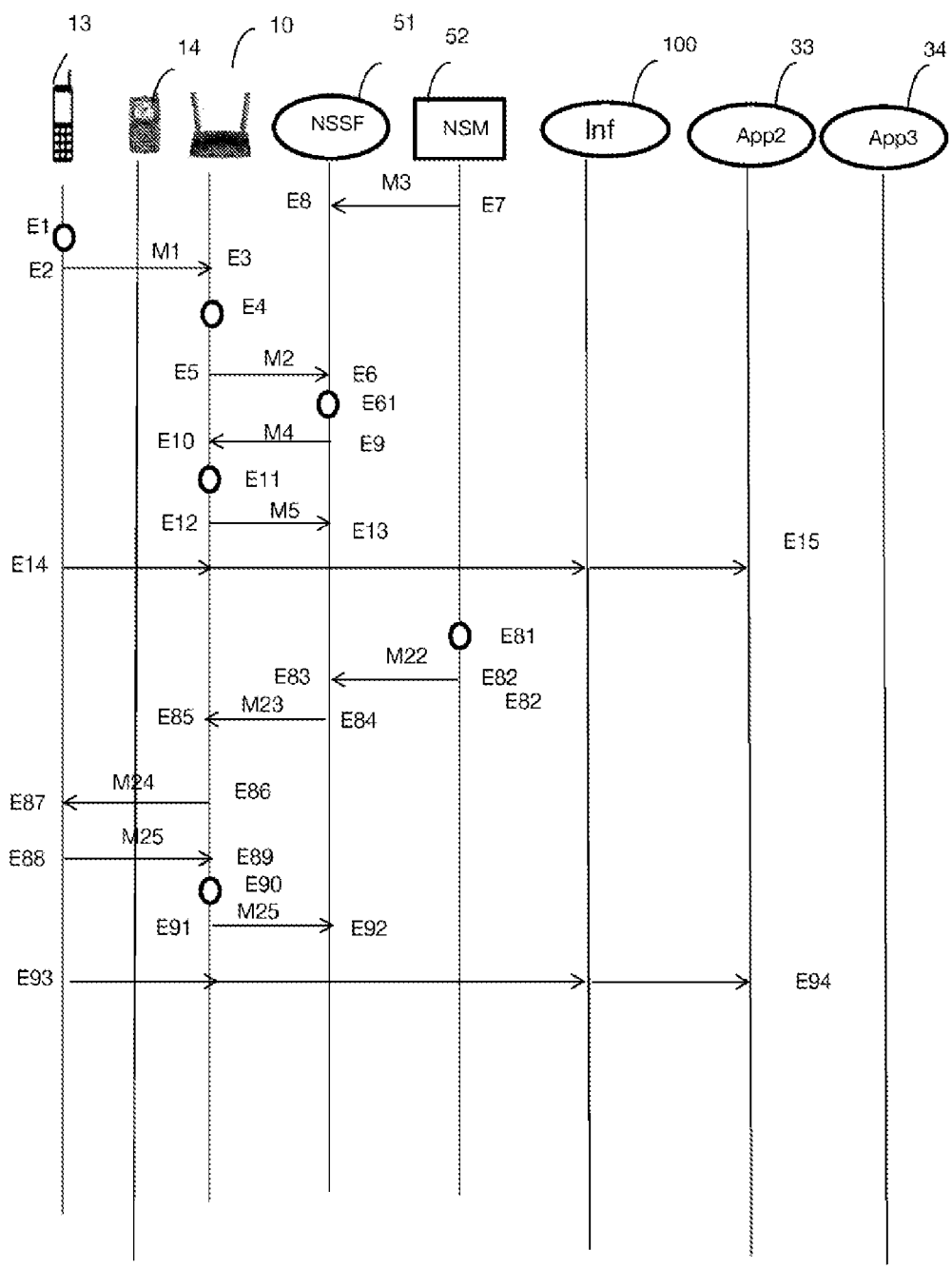
Figure 5:
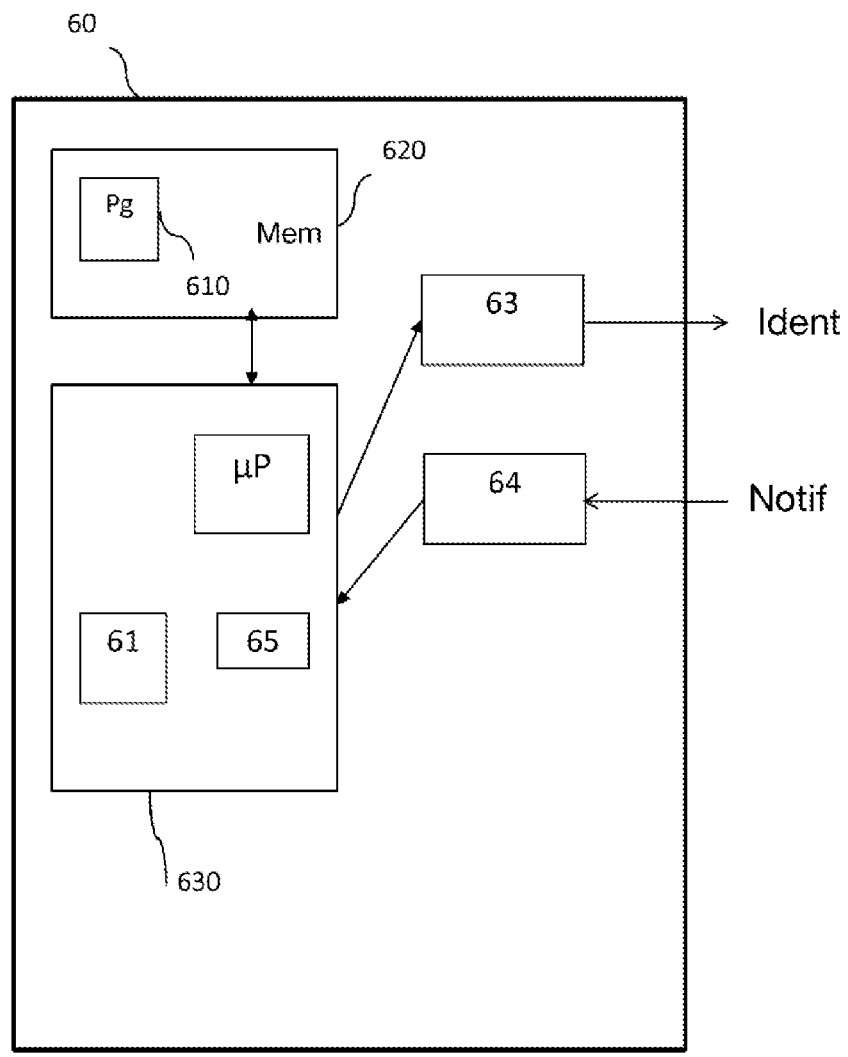

Other advantages and characteristics of the invention will become more clearly apparent on reading the following description of a particular embodiment of the invention, given by way of simple illustrative and nonlimiting example, and of the appended drawings, among which:

FIG. 1 presents a simplified view of an organization of a communication infrastructure according to the prior art, FIG. 2 presents a communication infrastructure according to one aspect of the invention, FIG. 3 presents an outline of the method for charging for the data of an application according to a first embodiment of the invention, FIG. 4 presents an outline of the method for charging for the data of an application according to a second embodiment of the invention, FIG. 5 presents an exemplary structure of a device for charging for the data of an application, according to one aspect of the invention.

5. DETAILED DESCRIPTION OF AT LEAST ONE EMBODIMENT OF THE INVENTION

In the subsequent description, examples are presented of several embodiments of the invention in a mobile communication infrastructure but the invention can also be implemented in a fixed network infrastructure knowing that the infrastructures undergoing definition at the 3GPP are aimed both at fixed and mobile infrastructures.

Reference is firstly made to FIG. 1 which presents a simplified view of an organization of a communication infrastructure according to the prior art.

The communication infrastructure 100 is organized into network slices. A network slice is implemented to ensure the conveying of data having common characteristics. These characteristics can relate to quality-of-service criteria, to security criteria, to types of terminals, to data sent for a specific application or indeed for data individual to a determined application provider. The communications infrastructure 100 conveys the data from and to the network 80. The infrastructure 100 conveys data of other networks and terminals and represents for example a communication infrastructure of a telecommunications operator. The network 80 may for example be a network deployed in a car, a train or else a house. The equipment 10, or access device for the network 80, ensures the connection between the network 80 and the infrastructure 100. This equipment is for example a domestic gateway or else a router implemented in a car, a train, etc. The equipment 10 (also called gateway hereinafter in the document) ensures the sending and the reception of the data for the terminals 11, 12, 13, 14 attached to the equipment 10 by electrical, fiber-optic wired links of Ethernet type, or by wireless links such as for example Bluetooth or Wi-Fi links. The network 80 is considered in FIG. 1 to be a communications network of a vehicle. The slice TR1 21 is for example used for the data sent by the sensor 11 uploading diagnosis information from the car to a platform Tel 31 of the vehicle manufacturer, the platform being accessible also to partners of the manufacturer such as equipment makers and security enterprises. The slice TR2 22 is used for access to video and audio contents offered by a content provider via a broadcasting platform App1 32 and a server CDN 35. The network slice TR3 23 conveys the data relating to assisted driving to an application App2 33 implemented specifically for this service. The slice TR3 23 requests an availability and a low latency for the data. Finally, the slice TR4 24 conveys the vehicle data to the Internet Int 34. The terminals 11, 12, 13, 14 may in certain cases transmit data only for a single slice or else on different slices as a function of the application generating or receiving the data. No limitation exists a priori as regards the number of slices that can be implemented in the infrastructure 100. The equipment 10 can itself transmit data to applications or platforms on one or more slices deployed in the infrastructure 100. In the techniques pertaining to the prior art, such as are described in the 3GPP specifications TR 23.799 v14.0.0 (December 2016) and 3GPP TS 23.501 v1.1.0 (July 2017), the network slices are implemented between the terminal connecting to the communications infrastructure, represented in FIG. 1 by the equipment 10, and the platforms such as Tel 31, App1 32 . . . , without taking into account the needs of the terminals attached to the equipment 10 and without transmitting any information relating to the charging for the data exchanged on the network slices.

In conjunction with FIG. 2, an outline of a communication infrastructure according to one aspect of the invention is presented.

The communication network 80 comprises two terminals 13, 14. It is immaterial whether the terminals are smartphones, tablets, sensors or any device able to communicate with the gateway 10 through a wired or wireless link. The gateway 10 is connected to the network 100 via a wired link, such as a fiber or an xDSL (in English Digital Subscriber Line) link or through a wireless link, for example via Wi-Fi or cellular access (3G, 4G, 5G . . . ). Within the communication network 100, a network slice composed of the virtualized functions VNF1, VNF2, VNF3 is represented. The network slices can also integrate non-virtualized functions. For the sake of simplification, a single network slice is represented. The gateway 10 is also connected to an NSSF (in English Network Slice Selection Function) entity 51 responsible for selecting the network slices for the gateway 10.

The entity 54 SP1 is a control platform managed by the manufacturer of the vehicle in which the network 80 is implemented. The manufacturer, via the platform 54, sends an order command to the entity 55 OM (in English Order Management) of the operator of the infrastructure 100 for a connectivity offer. This order command for the application 33 App2, whose data are conveyed by the operator of infrastructure 100, is described on the basis of diverse parameters, which include Service_Type, Split_Billing, Conditions_Split_Billing, Split_Billing_partners. The operator puts in place an entity 53 SC (in English Service Charging) responsible for usage billing.

The parameters of the Service_Type are for example IoT (in English Internet Of Things), eMBB (in English enhanced Mobile BroadBand), premium eMBB to guarantee a better quality of service for these streams, or critical eMBB to guarantee reliability of the data and low latency.

The Split_Billing parameter indicates whether or not the billing shared between the various players must be activated. If it is activated, different players, such as the operator of the infrastructure 100 and the vehicle manufacturer each obtain a remuneration.

The parameters of the Conditions_Split_Billing parameter consist for example in specifying the following conditions to be applied:
  billing in pre-paid mode or in post-paid mode,
  billing entity dedicated to the network slice or not,
  conditions of shared billing, as a function of the resources consumed or as a function of a threshold of transmitted data, for example.

The Split_Billing_partners parameter indicates the partners that will be billed according to the conditions hereinabove.

On the basis of the order command received, the entity 55 OM transmits a request for implementation of the order to the entity 52 NSM (in English Network Slice Manager). The request integrates the parameters received from the entity 54 SP1 during the order command.

The entity 52 NSM defines the network resources to be deployed on the basis of the request received. This entity 52 NSM also defines the charging policy to be applied for the request and transmits this policy to the entity 53 SC. The entity 52 NSM also defines the charging notification policy for the application corresponding to the order command and transmits this information to the entity 51 NSSF (in English Network Slice Selection Function). The entity 52 NSM carries out the following actions:
  it creates a network slice identifier for the application or else it associates the application with an existing network slice if a network slice is able, in particular in terms of quality of service and security, to convey the data of the application.
  it translates the charging conditions in terms of policies which will have to be applied by the charging system and in particular the entity 53 SC.
  it translates the charging conditions in terms of charging parameters which will be transmitted to the terminals when they transmit an identification message comprising the information relating to the application for which the order command was formulated.

The entity 53 SC thereafter transmits the charging information to the virtualized instances VNF1, VNF2, VNF3 involved in conveying the data relating to the application to the server 33 App2. The instances VNF1, VNF2 and VNF3 will transmit charging information to the billing entity 53 during the transport of the data relating to the application 33 App2. If the instances VNFs transport data relating to distinct network slices, the network slice identifier corresponding to the application 33 App2 must be associated with the data relating to the application 33 App2 so that each VNF can transmit the charging information corresponding to the data of the application 33 App2.

An orchestration entity, not represented in FIG. 2, can also be involved in implementing the network slice for conveying the data between the VNFs.

The procedure described in FIG. 2 makes it possible to associate an application with a network slice and to match charging parameters with the corresponding application. Thus the data sent by the terminals 13 and 14 that activated the application App2 destined for the server 33 App2 and transmitted by the gateway 10, are conveyed by VNF1, VNF2, VNF3 and charging information is transmitted by these VNFs to a billing system 53 ensuring the billing of the data in accordance with the charging parameters specified in the order command. The operator of the infrastructure 100 uses the charging information received for splitting the billing of the various players involved in providing the application App2 to the terminals 13 and 14.

Reference is now made to FIG. 3 which presents an outline of the method for charging for the data of an application according to a first embodiment of the invention.

The gateway 10 connects to the communication infrastructure 100 and transmits during a step I0 an initial-configuration message C0 to the network slices management entity 51. The gateway can obtain the address of the entity 51 in a message of DHCP (in English Dynamic Host configuration Protocol) type for a fixed network or during the establishment of the PDN (in English Packet Data Network) connection for a mobile network, or else by configuration in the gateway. The entity 51 receives the message C0 during step I1 and transmits during a step I2 an initial-notification message C1 comprising slice identifiers and charging parameters associated with these identifiers. To determine the slice identifiers to be transmitted, the entity 51 uses a parameter of the gateway 10, such as the IP (in English Internet Protocol) address, the MAC (in English Medium Access Control) address or an identifier of IMEI (in English International Mobile Equipment Identity) or MSISDN (in English Mobile Station Integrated Services Digital Network) type. For example, the gateway 10 can receive during step I3 a default slice identifier and the associated charging parameters allowing it to transmit and to receive data relating to Internet communications not requiring any specific processing and specific tariff setting.

During a step E1, an application App2 is activated on the terminal Term1 13. The activation of the application App2 can follow an action of a user who opens the application or else it can result from an automatic action, for example of a sensor which sends a data item to a server.

The activation of the application on the terminal Term1 13 is detected during a step E4 by the gateway 10. The gateway ensures the connectivity of the terminals 13 and 14 with data networks. This detection, according to an example, is carried out by the receiving of data, sent by the terminal Term1 13, relating to the application App2 or according to another example, by the dispatching of a control message sent by the terminal Term1 13 destined for the gateway 10. In the embodiment described in FIG. 3, it is considered that during step E4 the gateway 10 detects the activation of the application App2 on the terminal Term1 13 by the dispatching of data relating to the application App2 in a message M1 during step E2 and the receiving of this message M1 by the gateway 10 during step E3.

According to an alternative, the access device can send data relating to the application App2 detected on a network slice to which it is connected or to which it can connect. In particular the access device can transmit the data on a network slice that it has received during step I3. The network slice may for example be used until the initialization of the charging corresponding to the network slice used subsequently for transporting the data of the application App2.

According to another alternative, the data of the application are placed in memory, for example in a "buffer", before being transmitted once the initialization of the charging is carried out by the gateway 10.

During step E5, the gateway 10 sends an identification message M2 destined for a network slices management entity 51 of the communication infrastructure 100. The management entity 51 is in this example an NSSF server. The message M2 is for example a control message. The gateway 10 can, according to an example, transmit the message M2 via an access device of the communication infrastructure. This access device can be a base station of eNodeB type if the communication infrastructure is a 4G mobile network or of NR (in English NextGen Radio Access Network) type if it is a 5G network. During step E6, the server 51 NSSF receives the message M2 transmitted by the gateway 10. The message M2 received comprises an information item about the application App2 detected by the gateway 10. The information item can be, according to an example, an identifier of the application App2 or any other information item making it possible to unambiguously identify the application App2.

On the basis of the information item about the identifier of the application App2 present in the message M2, the server 51 NSSF selects during step E61 a network slice able to convey the data of the application App2 in the communication infrastructure 100 as well as the charging parameters corresponding to the conveying of the data of the application in the slice. It may either entail a network slice already implemented in the communication infrastructure 100 or else a new network slice if the network slices implemented in the infrastructure 100 do not make it possible to convey the data of the application App2. To determine the network slice and the charging parameters, the server 51 NSSF can use the information items transmitted by the entity 52 NSM such as is described in FIG. 2 and represented in FIG. 3 by the message M3 transmitted by the entity 52 NSM during step E7 and received by the server 51 NSSF during step E8. It should be noted that these steps E7 and E8 can occur at any moment during the method, including after the detection of the application by the gateway 10. The message M3 comprises a network slice identifier as well as the charging parameters. These charging parameters can be established on the basis of the parameters transmitted during the order command. It may entail a hexadecimal code or an attribute in text format making it possible to be interpreted by the gateway 10.

During a step E9, the server 51 NSSF transmits to the gateway 10, a network slice identifier corresponding to the application App2 as well as charging parameters associated with this network slice. On the basis of these attributes, the gateway 10 can determine the type of charging and in particular whether the application App2 executed by the terminal 13 will be billed by the operator of the infrastructure 100 and/or for example by the manufacturer of the vehicle that sent an order command, with reference to FIG. 2. The server 51 NSSF sends a message M4 comprising the network slice and the associated charging parameters. According to an example, not illustrated, the server 51 NSSF can transmit several slice identifiers with which charging parameters are associated. The gateway receives the message M4 during a step E10. It is considered that, in this embodiment, the gateway 10 receives several network slice identifiers and charging parameters associated with each network slice.

During a step E11, the gateway 10 selects a network slice identifier from among the identifiers received. This selection is possibly carried out by comparing the charging parameters associated with each network slice. The gateway will be able for example to select a network slice whose charging parameters determine a billing which is lower or borne by an entity other than that administering the gateway 10. According to another example, the gateway 10 relays the information to the terminal 13 which itself selects the network slice. This can be carried out via the notification on the screen of the terminal 13 of the billing conditions for a broadcasting service.

During a step E12, the gateway 10 transmits to the server 51 NSSF a message M5 comprising the slice identifier selected. It can, according to an example, also transmit the charging parameters associated with the selected slice. During a step E13, this message M5 is received by the server 51 NSSF. On receipt of the message M5 initializing the charging for the data of the application, the server 51 NSSF can, according to an example, inform the entities responsible for charging as well as the entities responsible for implementing the network slice. Following the message M5 received and the transmission by the server 51 of the initialization information item in respect of charging transmitted by the gateway 10 to the equipments responsible for charging, the data of the application App2 are charged a fee in accordance with the charging parameters associated with the selected network slice. Thus, for example, the equipment ensuring the connection of the gateway 10 to the network (or infrastructure) 100 can send charging tickets corresponding to the volume of data of the application App2 to a charging equipment in case of "offline" charging or receive charging credits originating from a charging equipment in case of so-called "online" charging. These charging data are thereafter potentially used for the billing of the various entities in accordance with the charging parameters of the slice in case of shared billing.

During a step E14, the terminal 13 sends the data relating to the application App2 destined for the application server 33 App2, these data being received and then transferred by the gateway 10 destined for the virtualized instances of the network slice of the communication infrastructure 100, the network slice corresponding to the identifier selected during step E11. The server 51 NSSF will have been able beforehand to transmit an information item comprising an identifier of the slice access equipment to which the gateway 10 must send the data relating to the application App2.

During a step E21, an application App3 on the terminal 14 is started. The terminal 14 is also attached by a wired or wireless link to the gateway 10 which is itself attached to the communication infrastructure 100. The following steps E22, E23, E24, E25 and E26 are identical to steps E2, E3, E4, E5, E6 respectively.

The server 51 NSSF does not have at its disposal any network slice identifier or associated charging parameters for the application App3. For this reason, it invokes during a step E27 the server 52 NSM by transmitting a message M13 comprising a request for a network slice for the application App3. The server 52 NSM receives the message M13 during step E28 and associates a network slice, for example subsequent to an order command received, such as described in FIG. 2. The server 52 NSM selects during a step E62 a network slice and charging parameters for the data of the application App3. If the application App3 is for example a video that the terminal 13 wishes to view by streaming, the server 52 NSM will be able to return a network slice offering a significant bitrate but having very undemanding quality-of-service characteristics in particular in terms of latency and with charging as a function of the volume of data of the application App3 that are transmitted, borne by the manager of the gateway 10.

During step E29, the server 52 NSM sends a message M14 comprising the identifier of the selected network slice and the charging parameters of the identifier for the application App3 to the server 51 NSSF. The server 51 NSSF receives the message during step E30.

During step E31, the server 51 NSSF transmits the identifier of the network slice and the charging parameters relating to the identifier in a message M15 received by the gateway 10 during step E32. The server 51 NSSF can store the received slice identifier and the associated charging parameters for the application App3 so as to be able to communicate them to an equipment during a future invoking.

During step E33, the gateway 10 decides to refuse the identifier and the associated charging parameters received from the server 51 NSSF, for example because of the charging for the data of the application by volume and because this charging is borne by the manager of the gateway 10.

During step E34, the gateway 10 sends a message M16 of refusal of the network slice identifier and charging parameters received. This message M16 is received by the server 51 NSSF during step E35.

On receipt of the message M16, the server 51 NSSF sends a message M17 comprising a so-called default network slice with charging parameters corresponding to a fixed-price cost borne by the manager of the gateway 10, during step E36. This network slice offers an unguaranteed and limited bitrate as well as minimum characteristics of quality of service. The recommendation message M17 is received by the gateway 10 during step E37. During step E38, the gateway 10 acknowledges receipt of the message M17 by dispatching an acknowledgment message M18 destined for the server 51 NSSF, thus triggering the charging in accordance with the charging parameters present in the message M17 for the default network slice. The server 51 NSSF, on receipt of the message M18 during step E39, informs the entities responsible for charging and for implementing the network slices, that the data of the application App3 will be conveyed on the default network slice with fixed-rate charging.

The data of the application App3 which are sent by the terminal 13 during step E40 are conveyed to the gateway 10 and then to the infrastructure 100. Within the infrastructure 100, the data of the application App3 are transmitted via the default network slice up to the application server 34 App3 which receives them during step E41.

Reference is now made to FIG. 4 which presents an outline of the method for charging for the data of an application according to a second embodiment of the invention.

The first steps from step E1 to step E15 are identical to steps E1 to E13 described in FIG. 3. During step E14, the terminal 13 sends the data relating to the application App2 destined for the application server 33 App2, these data being received and then transferred by the gateway 10 destined for the virtualized instances of the network slice of the communication infrastructure 100, the network slice corresponding to the identifier selected during step E11. It is considered in this embodiment that the network slice selected by the gateway 10 during step E11 is a network slice TR1 whose tariff setting is related to volumes of data transmitted and received by the terminal 13 with a capping of the volume of data allowed and which tariff setting is indicated in the order command initially received. This signifies that onward of a certain volume of the application App2 data exchanged by the terminal 13 with the application App2 33, the tariff of the additional data becomes much greater.

The entity 52 NSM detects during a step E81 that the data cap authorized for a tariff T1 is attained. This detection is implemented for example by the receipt of a message not represented in FIG. 4 originating from an equipment responsible for metering and charging the services (such as for example the entity 53 SC represented in FIG. 2 but not represented in FIG. 4). This signifies that the charging for the data exchanged on the network slice used to transmit the data of the application App2 will evolve.

During a step E82, the entity 52 NSM transmits a message M22 to the entity 51 NSSF, indicating that the data cap for the tariff setting T1 is attained for the terminal 13. The server 51 NSSF receives the message M22 during step E83.

On receipt of this message M22, it transmits to the gateway 10 a message M23 comprising network slice identifiers and the tariff-setting parameters associated with the slices. In particular, it transmits the new tariff-setting parameters of the slice TR1 for the data of the application App2.

According to another example, the server 51 NSSF transmits only the slice identifier corresponding to the slice TR1 and the new tariff-setting parameters.

On receipt of the message M23 during step E85, the gateway 10 transmits a message M24 to the terminal 13 during step E86, comprising an information item indicating that the data cap for the application App2 at the tariff T1 is attained and that the future data of the application App2 will be under tariff conditions T2. The terminal 13, on receipt of the message M24 during step E87, indicates to the user by an alert message that the data cap for the application App2 is exceeded and that the billing conditions are modified, for example by a specific display on the screen.

The user, according to a scheme not described in this document, takes a decision about the desire to continue to use the application App2 and during step E88 transmits a message M25 to the gateway 10 comprising an information item indicating to the gateway 10 that data relating to the application App2 will still be transmitted and received by the terminal 13.

On receipt of the message M25 during step E89, the gateway 10 selects during step E90 a network slice to convey the data of the application App2.

According to a first example, the terminal 13 indicates to the gateway 10 in the message M25 that it will pay for the data of the application App2 at the new tariff T2. The gateway then selects the network slice used previously but with new charging parameters T2.

According to a second example, the terminal 13 does not indicate to the gateway 10 that it will pay for the data of the application App2 under the tariff conditions T2 or indicates that it will not pay for them, and the gateway selects another network slice to convey the data of the application App2 for the terminal 13 and chooses for example a default network slice offering fewer guarantees in terms of security, quality of service, reliability but having less expensive charging parameters than the tariff T2.

According to a third example, the gateway 10 transmits a message to the server 51 NSSF to invoke the support of a new network slice and of charging parameters. The server 51 NSSF can invoke the server 52 NSM to obtain this information. A new order command can, according to an alternative, be proposed to the provider if the tariff setting assumes this provider takes responsibility.

During step E91 a message M25 comprising the selected network slice identifier is dispatched to the server 51 NSSF by the gateway 10. This message may optionally also comprise the charging parameters associated with the selected network slice. On receipt of the message M25 during step E92 initializing the charging for the data of the application App2, the server 51 NSSF informs the entities responsible for charging and for implementing the network slices, that the application App2 data sent by the terminal 13 will be conveyed on the network slice whose identifier was transmitted by the gateway 10 in the message M25.

The application App2 data sent by the terminal 13 during step E93 are conveyed to the gateway 10 and then to the infrastructure 100. Within the infrastructure 100, the data of the application App3 are transmitted via the network slice selected by the gateway 10 up to the application server 33 App2 which receives them during step E94, and are billed in accordance with the charging parameters selected by the gateway 10.

An exemplary structure of a device for charging for the data of an application according to one aspect of the invention is presented in conjunction with FIG. 5.

The charging device 60 implements the charging method, various embodiments of which have just been described.

Such a device 60 can be implemented in an access device. The access device can be an equipment for residential customers or professional customers, connected to a fixed network or to a mobile network. The access device can also be a terminal, a modem, a femtocell device, etc.

For example, the device 60 comprises a processing unit 630, equipped for example with a microprocessor µP, and driven by a computer program 610 stored in a memory 620 and implementing the charging method according to the invention. On initialization, the code instructions of the computer program 610 are for example loaded into a RAM memory, before being executed by the processor of the processing unit 630.

Such a device 60 comprises:
a detector 61, able to detect an activation of the application
a sender 63, able to send an identification message Ident comprising an information item relating to the identification of the application destined for a network slices management entity,
a receiver 64, able to receive from the network slices management entity a notification message Notif comprising at least one network slice identifier and charging parameters associated with the at least one identifier,
an initialization module (65), able to initialize a charging for the data of the application.

The charging device furthermore comprises, according to one embodiment:
the sender 63, able to send to the network slices management entity an initial-configuration message comprising at least one parameter of the access device upon the attachment of the access device to the network,
the receiver 64, able to receive from the management entity an initialization message comprising at least one network slice identifier and charging parameters associated with the identifiers.

The charging device furthermore comprises, according to another embodiment:
the sender 63, able to send to a terminal (13, 14) attached to the access device (10), an information message (M24) comprising a data item relating to the at least one network slice identifier and the charging parameters associated with the at least one identifier,
the receiver 64, able to receive from the terminal (13, 14) a recommendation message (M25) comprising an information item relating to the initialization of the charging.

The charging device furthermore comprises, according to yet another embodiment, a module for selecting a network slice identifier and associated charging parameters.

The charging method advantageously makes it possible to be able to condition the allocation and the selection of networks slices by an access device, as a function of charging parameters used to split the charges for implementing a service and billing between various players involved in the provision of services. Thus, an access device can transmit data sent by terminals which are attached to it and possibly managed by entities that are different from the entity managing the access device on network slices exhibiting quality-of-service, latency, bitrate parameters corresponding to charging parameters. In particular, in the case where the access device offers terminals Internet connections with different bitrates and quality-of-service parameters, the data of an application which is activated on a terminal that has contractualized a value added service with the access device will be conveyed on a higher-performance network slice than the data of an application which is activated on a terminal that has contractualized a "best effort" offer. The charging method thus makes it possible to be able to enrich the process of network slice selection by an access device with tariff conditions that are possibly negotiated with the terminals for which the access device ensures the provision of connectivity. This method could furthermore allow terminals to select an access device as a function of charging parameters proposed by the access devices.

The invention claimed is:

1. A charging method for charging for data of an application that are transmitted on a slice of a communication network, the method comprising the following acts implemented by an access device for access to the network and comprising:
    detecting an enablement or a start of the application,
    sending an identification message destined for a network slices management entity, the identification message comprising an information item relating to identification of the detected application,
    receiving from the network slices management entity a notification message comprising at least one network slice identifier corresponding to the detected application and charging parameters associated with the at least one network slice identifier.

2. The charging method, as claimed in claim 1, furthermore comprising:
    sending to the network slices management entity an initial-configuration message comprising at least one parameter relating to the access device, upon the attachment of the access device to the network,
    receiving from the management entity an initial-notification message comprising at least one initial network slice identifier and initial charging parameters associated with the at least one initial network slice identifier, the at least one initial network slice identifier being determined on the basis of the parameter of the access device.

3. The charging method, as claimed in claim 1, furthermore comprising selecting by the access device a network slice identifier and the associated charging parameters.

4. The charging method, as claimed in claim 3, furthermore comprising sending by the access device a message of acceptance comprising the selected network slice identifier.

5. The charging method, as claimed in claim 1, furthermore comprising sending, to the network slices management entity, a refusal message.

6. The charging method, as claimed in claim 5, furthermore comprising receiving a recommendation message comprising the identifier of another, so-called default, network slice.

7. The charging method, as claimed in claim 1, furthermore comprising receiving a message of modification of charging parameters associated with a network slice.

8. The charging method, as claimed in claim 1, where the act of detecting is carried out by receiving data relating to the application originating from a terminal attached to the access device.

9. The charging method, as claimed in claim 1, furthermore comprising:
    sending, to a terminal attached to the access device, an information message comprising a data item relating to the at least one network slice identifier and the charging parameters associated with the at least one identifier,
    receiving, from the terminal a recommendation message comprising an information item relating to the initialization of the charging.

10. The charging method, as claimed in claim 1, where the management entity is an NSSF (Network Slice Selection Function) device.

11. The charging method, as claimed in claim 1, where the charging parameters are included in S-NSSAI (Single Network Slice Selection Assistance Information) data.

12. The charging method, as claimed in claim 1, furthermore comprising initializing the charging for the data of the application, as a function of the received notification message.

13. An access device for access to a communication network, the access device comprising:
    a processing unit;
    a non-transitory computer-readable medium comprising instructions stored thereon, which when executed by the processing unit configure the access device to charge for data of an application that are transmitted on a slice of the communication network, by:
    detecting an enablement or a start of the application,
    sending an identification message destined for a network slices management entity, the identification message comprising an information item relating to identification of the detected application, and
    receiving from the network slices management entity a notification message comprising at least one network slice identifier and charging parameters associated with the at least one network slice identifier.

14. A charging system comprising
    an access device for access to a communication network, the access device comprising:
    a first processing unit;
    a first non-transitory computer-readable medium comprising instructions stored thereon, which when executed by the processing unit configure the access device to charge for data of an application that are transmitted on a slice of the communication network, by:
    detecting an enablement or a start of the application,
    sending an identification message destined for a network slices management entity, the identification message comprising an information item relating to identification of the detected application,
    receiving from the network slices management entity a notification message comprising at least one network slice identifier and charging parameters associated with the at least one network slice identifier;
    the network slices management entity, which comprises:
    a receiver, configured to receive the identification message comprising the information item relating to the identification of the application,
    a sender, configured to send the notification message comprising the at least one network slice identifier and the charging parameters associated with the at least one network slice identifier, a selection module, configured to select the at least one network slice identifier and the charging parameters associated with the at least one network slice identifier.

15. A non-transitory computer-readable recording medium comprising instructions stored thereon, which when executed by a processing unit of an access device for accessing a communication network, configure the access device to charge for data of an application that are transmitted on a slice of the communication network, by:
  detecting an enablement or a start of the application,
  sending an identification message destined for a network slices management entity, the identification message comprising an information item relating to identification of the detected application, and
  receiving from the network slices management entity a notification message comprising at least one network slice identifier and charging parameters associated with the at least one network slice identifier.

* * * * *